(12) United States Patent
Novak et al.

(10) Patent No.: US 8,992,782 B2
(45) Date of Patent: Mar. 31, 2015

(54) SKIMMING SYSTEMS AND METHODS

(75) Inventors: Yuriy Novak, Granada Hills, CA (US); Gilbert G. Kovelman, St. Clarita, CA (US); Joyce A. Kovelman, legal representative, Santa Clarita, CA (US)

(73) Assignee: Novak Inc., Granada Hills, CA (US)

( * ) Notice: Subject to any disclaimer, the term of this patent is extended or adjusted under 35 U.S.C. 154(b) by 607 days.

(21) Appl. No.: 13/300,149

(22) Filed: Nov. 18, 2011

(65) Prior Publication Data
US 2013/0126441 A1    May 23, 2013

(51) Int. Cl.
*E04H 4/16*    (2006.01)
*E02B 15/08*   (2006.01)
*C02F 1/40*    (2006.01)
*C02F 103/08*  (2006.01)
*C02F 103/42*  (2006.01)

(52) U.S. Cl.
CPC . *E02B 15/08* (2013.01); *C02F 1/40* (2013.01); *C02F 2103/08* (2013.01); *C02F 2103/42* (2013.01); *E04H 4/169* (2013.01)
USPC ........................................ 210/776; 210/167.1

(58) Field of Classification Search
CPC .... C02F 1/40; C02F 2103/42; C02F 2103/08; E04H 4/169; E02B 15/08
USPC ................................................ 210/776, 167.1
See application file for complete search history.

(56) References Cited

U.S. PATENT DOCUMENTS

| 3,278,949 | A | * | 10/1966 | Whitaker | 210/97 |
| 3,449,772 | A | * | 6/1969 | Werner | 4/490 |
| 3,486,623 | A | * | 12/1969 | Bosico | 210/167.12 |
| 3,506,489 | A | * | 4/1970 | Baker | 134/10 |
| 3,762,169 | A | * | 10/1973 | Graham | 405/62 |
| 4,114,206 | A | * | 9/1978 | Franc | 4/490 |
| 4,561,133 | A | * | 12/1985 | Laing | 4/491 |
| 4,640,784 | A | * | 2/1987 | Cant | 210/776 |
| 5,149,443 | A | * | 9/1992 | Varnam | 210/739 |
| 5,454,940 | A |   | 10/1995 | Lakotish | 210/169 |
| 5,536,397 | A | * | 7/1996 | D'Offay | 210/167.19 |
| 7,311,820 | B1 | * | 12/2007 | Anderson | 210/167.1 |
| 7,455,767 | B2 | * | 11/2008 | Pamperin | 210/167.2 |
| 8,455,874 | B2 | * | 6/2013 | Choi et al. | 257/59 |
| 2004/0226896 | A1 | * | 11/2004 | Lovestead et al. | 210/776 |

OTHER PUBLICATIONS

Kalvar, "Skimming the Surface: The Evolution of Perimeter Recirculation Systems and what it Means to your Facility," Parks & Recreation, Feb. 1, 1997, URL=http://www.thefreelibrary.com/_/print/PrintArticle.aspx?id=19203763, 6 pages.
Burns, "Analyzing the Effects of Pressure and Flow in Power Spray Washing," White Paper from Proceco Ltd., URL=http://www.proceco.com_news_info/5_technical-papers/pressure_and_flow.pdf, downloaded Aug. 21, 2011, 2 pages.
"PoolSkim is your answer for a hassle-free pool," PoolSkim Home Page, URL=http://www.poolskim.com/, downloaded Oct. 12, 2011, 5 pages.
Ray Padula Rain Dance Oscillating Sprinkler, Product details downloaded from http://www.target.com, URL no longer available, downloaded Aug. 21, 2011, 1 page.

* cited by examiner

*Primary Examiner* — Fred Prince
(74) *Attorney, Agent, or Firm* — Seed IP Law Group PLLC

(57) ABSTRACT

Skimming systems are provided which include one or more externally positioned fluid jet generating devices to generate one or more fluid jets to impinge on a target surface to collectively impart motion of the surface and any contaminants thereon toward a collection device for ultimate collection and removal of the contaminants. Related skimming methods are also provided.

9 Claims, 4 Drawing Sheets

SKIMMING SYSTEMS AND METHODS

BACKGROUND

1. Technical Field

This disclosure generally relates to systems and methods for skimming debris or other matter from the surface of a body of fluid, including, for example, systems and methods for effectively skimming the surface of a swimming pool to remove undesired debris or other floating matter.

2. Description of the Related Art

Swimming pool construction and maintenance systems are generally well known and can include systems which circulate pool water in combination with various types of diversified skimmers, including complex linkage and water jet or wheel driven devices active both above and below the pool water surface to attempt some degree of debris removal from the pool, particularly from the bottom and sides of the pool. However, despite the diversity of such known systems, a significant percentage of debris typically found in pools, such as foliage, other plant residue, dirt, scum and the like, float at or near the upper surface of the pool, and this debris is usually left to the mercy of happenstance and inefficient removal by gradual drift to a skimmer. Frequently, the movement of debris is delayed to the point of becoming waterlogged thereby causing the debris to sink to the bottom of the pool where cleanup is typically more cumbersome. Furthermore, many known skimming systems are quite complex and bulky and can disrupt the use and enjoyment of the pool during operation.

BRIEF SUMMARY

The skimming systems and methods described herein provide for the efficient directing, collecting and removal of debris from the surface of a fluid body. The debris may be particulate, aggregative, homogenous or heterogeneous, fluid or solid or any combination thereof, provided it is located at or near a fluid surface, and may be simply deposited on or at the surface, in suspension at or near the surface, either integral with the fluid body or discretely separate from the fluid body. Examples of debris include dirt, foliage and other matter deposited on the liquid surface of a swimming pool or oil present at or near the surface of the sea, such as, for example, an oil slick which may arise from oil spills.

Many of the skimming systems and methods described herein are particularly well adapted for efficiently clearing a surface of a pool of undesired debris in an unobtrusive form factor. This may facilitate increased use and enjoyment of the pool.

A method of skimming a pool may be summarized as including impinging a surface of the pool with a plurality of fluid jets, the fluid jets oriented to impinge on the surface at an average striking angle of less than forty-five degrees; and moving the plurality of fluid jets in a selected pattern so that the fluid jets sweep across at least a portion of the surface of the pool while the fluid jets impinge on the surface to collectively impart motion of the surface of the pool generally toward a debris collection device. Moving the plurality of fluid jets in the selected pattern may include oscillating a plurality of fluid jet devices each configured to generate at least one fluid jet so that the at least one fluid jet of each fluid jet device sweeps a respective section of the surface of the pool. Oscillating the plurality of fluid jet devices may include rotating a nozzle portion of at least one fluid jet device back and forth about an axis of rotation generally perpendicular to the surface of the pool to sweep the at least one fluid jet thereof across a sector of the pool with a reach of the fluid jet remaining generally constant. Oscillating the plurality of fluid jet devices may include rotating a nozzle portion of at least one fluid jet device back and forth about an axis of rotation generally parallel to the surface of the pool to sweep the at least one fluid jet thereof across a sector of the pool with a reach of the fluid jet varying as the nozzle portion rotates. Oscillating the plurality of fluid jet devices may include oscillating the plurality of fluid jet devices so that a sector swept by the at least one fluid jet of one of the fluid jet devices overlaps with another sector swept by the at least one fluid jet of an adjacent fluid jet device. In addition, oscillating the plurality of fluid jet devices may include oscillating the plurality of fluid jet devices in a coordinated manner to sweep at least a majority of the surface of the pool. Moving the plurality of fluid jets in the selected pattern may include selectively varying a discharge velocity of the fluid jets.

Impinging the surface of the pool with the plurality of fluid jets may include impinging the surface with fluid jets generated by an array of fluid jet orifices positioned on a fluid jet nozzle portion of a common fluid jet device. Impinging the surface of the pool with the plurality of fluid jets may include impinging the surface with at least one of a planar fan-shaped fluid jet, a conical-shaped fluid jet and an array of generally parallel acting fluid jets. Impinging the surface of the pool with the plurality of fluid jets includes impinging the surface of the pool with the plurality of fluid jets oriented to impinge on the surface at an average striking angle between about five degrees and about forty degrees. Impinging the surface of the pool with the plurality of fluid jets includes impinging the surface of the pool with the plurality of fluid jets oriented to impinge on the surface at an average striking angle between about five degrees and about twenty degrees. Impinging the surface of the pool with the plurality of fluid jets and moving the plurality of fluid jets in the selected pattern may include impinging the surface of the pool with the plurality of fluid jets over at least a majority of the surface of the pool and providing sufficient energy to carry foliage from one side of the pool to an opposing side thereof.

The method may further include positioning at least one fluid jet device at a perimeter of the pool to selectively generate at least one of the plurality of fluid jets for impinging on the surface of the pool. Positioning at least one fluid jet device at the perimeter of the pool may include positioning a series of fluid jet devices along the perimeter of the pool, each fluid jet device configured to selectively generate at least one of the plurality of fluid jets for impinging on the surface of the pool. Positioning at least one fluid jet device at the perimeter of the pool may include selectively adjusting a pitch and a yaw of the fluid jet device.

A pool skimming system may be summarized as including a fluid jet device coupleable to a fluid source to selectively generate at least one fluid jet when fluid passes through the fluid jet device during a pool skimming operation; and a poolside mounting device configured to support the fluid jet device at a position along a perimeter of the pool and to orient the fluid jet device so that the at least one fluid jet selectively generated by the fluid jet device during the pool skimming operation impinges on a surface of the pool to direct debris from a target area on the surface of the pool toward a debris collection area. The poolside mounting device may include one or more manipulable joints for selectively adjusting the fluid jet device with respect to at least two degrees of freedom, such as, for example, adjusting a pitch and a yaw of the fluid jet device.

A plurality of fluid jet devices may be coupled to the fluid source to each selectively generate at least one fluid jet with each of the plurality of fluid jet devices located at different positions along the perimeter of the pool. The plurality of fluid jet devices may be positioned and configured so that the fluid jets thereof collectively impinge upon at least a majority of the surface of the pool. The plurality of fluid jet devices may be positioned and configured so that the fluid jets thereof collectively provide sufficient energy during the skimming operation to carry foliage from one side of the pool to an opposing side thereof. The plurality of fluid jet devices may be positioned so that at least two sectors of the surface of the pool swept by the plurality of fluid jets overlap.

Each of the fluid jet devices may include a movable nozzle portion to sweep the at least one fluid jet thereof across a portion of the surface of the pool to collectively impart motion of the surface of the pool generally toward the debris collection area. The poolside mounting device may be configured to orient the fluid jet device so that the at least one fluid jet impinges on the surface of the pool at an average striking angle between about five degrees and about forty degrees during the pool skimming operation. The fluid jet device may include a nozzle portion to oscillate back and forth about an axis of rotation which is oriented generally perpendicular to the surface of the pool when the fluid jet device is coupled to the poolside mounting device. The fluid jet device may include a nozzle portion to oscillate back and forth about an axis of rotation which is oriented generally parallel to the surface of the pool when the fluid jet device is coupled to the poolside mounting device. The fluid jet device may be in fluid communication with a valve which is adjustable to vary a discharge velocity of the at least one fluid jet. The fluid jet device may include a nozzle portion having an array of fluid jet orifices to generate a plurality of distinct fluid jets during the skimming operation. The fluid jet device may include a nozzle portion configured to generate one of a planar fan-shaped fluid jet, a conical-shaped fluid jet and an array of generally parallel acting fluid jets.

The pool skimming system may further include a controller to selectively control a flow of fluid to the fluid jet device during the pool skimming operation. The controller may be configured to coordinate the movement of one or more fluid jets of each of a plurality of fluid jet devices during the pool skimming operation to effectively move foliage from one side of the pool to an opposing side thereof. The controller may be configured to intermittingly supply fluid to a plurality of fluid jet devices during the skimming operation.

A method of collecting oil from a surface of the sea may be summarized as including positioning a plurality of fluid jet generating stations around a perimeter of an oil slick on the surface of the sea; and impinging the surface of the sea with a plurality of fluid jets generated by the fluid jet generating stations, the fluid jets oriented to impinge on the surface at an average striking angle relative to a horizontal reference plane of less than forty-five degrees and to collectively impart motion of the surface generally toward an oil collection device.

Positioning the plurality of fluid jet generating stations around the perimeter of the oil slick may include positioning the fluid jet generating stations so that the fluid jets thereof disperse during operation to impinge on at least a majority of the perimeter. Impinging the surface with the plurality of fluid jets may include impinging the surface with the plurality of fluid jets to collectively impart a motion of the oil slick generally in a direction aligned with a direction of a motion of the sea induced by natural forces. The method may further include oscillating at least some of the fluid jets generated by the fluid jet generating stations while impinging the surface of the sea.

BRIEF DESCRIPTION OF THE SEVERAL VIEWS OF THE DRAWINGS

In the drawings, identical reference numbers identify similar elements or acts. The sizes and relative positions of elements in the drawings may not be necessarily drawn to scale. For example, the shapes of various elements and angles may not be drawn to scale, and some of these elements may be arbitrarily enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and techniques associated with skimming systems and methods may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
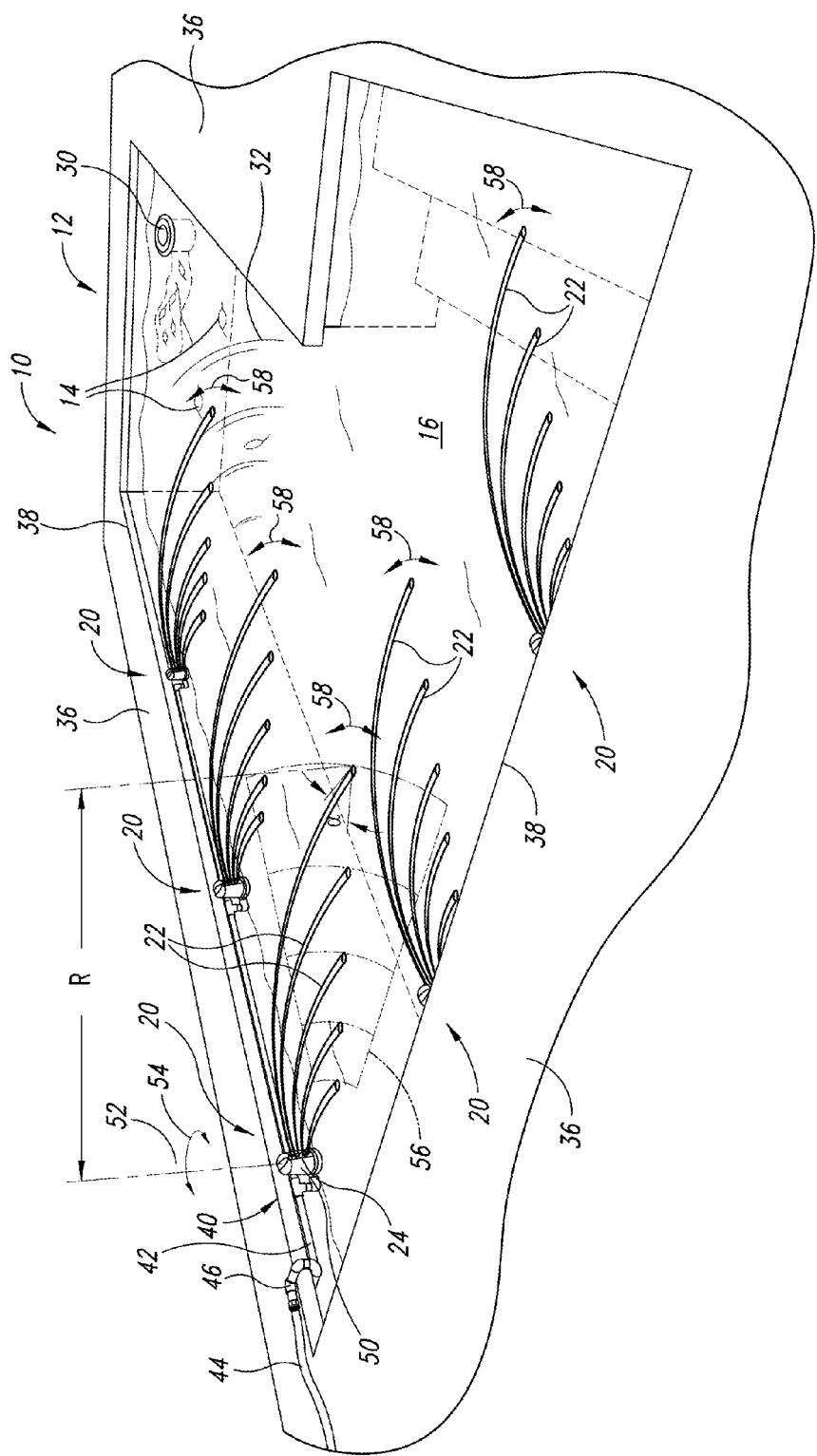
FIG. 1 is a perspective view of a skimming system for a pool according to one example embodiment.

FIG. 1 shows a skimming system 10 according to one example embodiment. The skimming system 10 is installed in a swimming pool 12 for removing debris 14 from a surface 16 thereof. The skimming system 10 includes a plurality of fluid jet devices 20 which are each configured to selectively generate a plurality of fluid jets 22 when fluid is passed through respective fluid jet orifices 24 thereof. The fluid jets 22 are oriented to impinge on the surface 16 of the pool 12 to collectively impart motion of the surface 16 of the pool 12 generally toward a debris collection device 30, as represented by the ripple front labeled 32. The debris collection device 30 may be a suction type device, such as, for example, the stationary suction-type debris collection device available from Poolskim USA of Wheaton, Illinois under the trademark Poolskim™ or any other device which is configured to collect and/or remove debris from a localized area of the pool 12. The debris collection device 30 may be fixedly secured to the pool 12 and located in a remote area of the pool 12 so as to minimize obstruction to swimming activities and the like.

The fluid jet devices 20 are positioned at or near the poolside or pool deck 36 surrounding the pool 12, and more particularly, along or adjacent the perimeter 38 of the pool 12. In the illustrated embodiment of FIG. 1, the fluid jet devices 20 are installed slightly within the perimeter 38 of the pool 12 at positions just above the surface 16 of the pool 12. In this manner, the fluid jets 22 may originate at a height below the surface of the pool deck 36 with a trajectory oriented generally away from the side of the pool 12 to impinge on the surface 16 of the pool 12 during operation. The fluid jets 22 may have an initial trajectory that is generally parallel to the surface 16 of the pool 12. For example, a centerline of the fluid jet orifices 24, which generate the fluid jets 22, may be aligned within ±twenty degrees of a direction parallel to the surface 16 of the pool 12.

The fluid jet devices 20 are configured so that during a skimming operation the fluid jets 22 impinge on the surface with relatively shallow striking angles α, such as, for example, striking angles of less than about forty-five degrees in some embodiments and striking angles of less than about thirty degrees in other embodiments. Although the fluid jets 22 may be generally collimated, as shown in FIG. 1, the fluid jets can also be of various other forms and dispersion patterns, such as, for example, fan-shaped fluid jets and conical-shaped fluid jets. In addition, a single fluid jet 22 having a planar fan-shape or other shape dispersion pattern may be provided in lieu of the plurality of fluid jets 22. Accordingly, in some embodiments, the fluid jet or fluid jets 22 are better characterized by an average striking angle. In such embodiments, the average striking angle of the fluid jet or jets 22 may be between about five degrees and about forty degrees, or in some embodiments, between about five degrees and twenty degrees. Irrespective of the specific striking angle, the fluid jets 22 are directed to impinge on the surface 16 of the pool 12 to impart a driving force having a horizontal component that acts parallel to the surface 16 of the pool 12 to direct the surface fluid and any debris thereon in a direction generally away from the origin of the fluid jet or jets 22 and toward the debris collection device 30. Accordingly, in some embodiments, the average striking angle of the fluid jet or jets 22 may be greater than forty degrees and less than ninety degrees. It is appreciated, however, that the skimming operation may be less efficient in such embodiments as the relatively steeper striking angle results in a driving force having a horizontal component that is diminished relative to similar jets acting at relatively shallower striking angles.

The fluid jet devices 20 of FIG. 1 are coupled to the pool deck 36 by a poolside mounting device 40 in the form of a conduit system 42 which supports the fluid jet devices 20 above the surface 16 of the pool 12. The conduit system 42 may be removably secured to the pool deck 36 with conventional fasteners, such as, for example, threaded bolts or clamps, or may be integrated into the pool deck 36 during construction or reconstruction of the pool 12. In some embodiments, the fluid jet devices 20 may be mounted on the pool deck 36 in select locations and reconfigured as needed to ensure sufficient coverage of the surface 16 of the pool 12 with the impinging fluid jets 22.

In the embodiment of FIG. 1, the conduit system 42 is coupleable to a fluid source (not show), such as, for example, a supply of residential water. The water supply may be coupled to the conduit system 42 by a conventional garden hose 44 and associated fittings 46. In some embodiments, a manifold (not shown) may be provided to assist in distribution of the water to the fluid jet devices 20. A controller and/or valves (not shown) may be provided intermediate the water supply and the fluid jet devices 20 to selectively control a flow of water to each of the fluid jet devices 20. For example, in some embodiments, a controller may be provided in conjunction with a distribution manifold to coordinate the supply of fluid to the fluid jet devices 20. The fluid jet devices 20 may be coordinated, for example, to operate simultaneously or sequentially. In addition, a volumetric flow rate or other flow characteristics may be controlled to adjust a range R of the fluid jets 22 during the skimming operation. Still further, in some embodiments, a supplemental pump device may be coupled to the fluid source to enable the formation of high-pressure fluid jets. In other embodiments, the conduit system 42 may be coupled directly to a supply of residential water without a controller and with the supply of water being controlled solely by one or more manual valves, such as, for example, a water spigot.

Each of the fluid jet devices 20 of FIG. 1 include a nozzle portion 50 which is configured to rotate about an axis of rotation 52, as represented by the arrow labeled 54. In this manner, the fluid jet devices 20 may rotate or oscillate so that the fluid jets 22 thereof sweep through a respective sector 56 of the surface 16 of the pool 12, as represented by the arrows labeled 58. The sectors 56 swept by the fluid jets may collectively cover at least a majority of the surface 16 of the pool 12, and in some embodiments, may cover seventy-five percent or more of the surface 16. Each sector 56 may be a discrete isolated region or may overlap with one or more adjacent sectors 56.

As shown in FIG. 1, the axis of rotation 52 of the fluid jet devices 20 may be generally vertical. In other embodiments, the axis of rotation 52 may be between about zero and about twenty-five degrees from a vertical position. In this manner, the fluid jets 22 may have an initial upward or downward trajectory when exiting the orifices 24 of the nozzle portion 50. Sweeping the fluid jets 22 back and forth enables the fluid jets 22 to impart motion to a relatively more substantial portion of the pool 12. In addition, the sweeping motion can assist in driving debris 14 toward the debris collection device 30 more efficiently than embodiments featuring static nozzles.

In other embodiments, one or more of the fluid jet devices 20 may include a static nozzle portion such that the fluid jet or jets 22 thereof do not oscillate during the skimming operation. For example, in one embodiment, all of the fluid jet devices 20 of the skimming system 10 may include a static nozzle portion such that the fluid jet or jets 22. In such embodiments, an operating pressure of the fluid jet devices 20 may optionally fluctuate to create a pulsing action of the fluid jet or jets 22 thereof.

Figure 2:
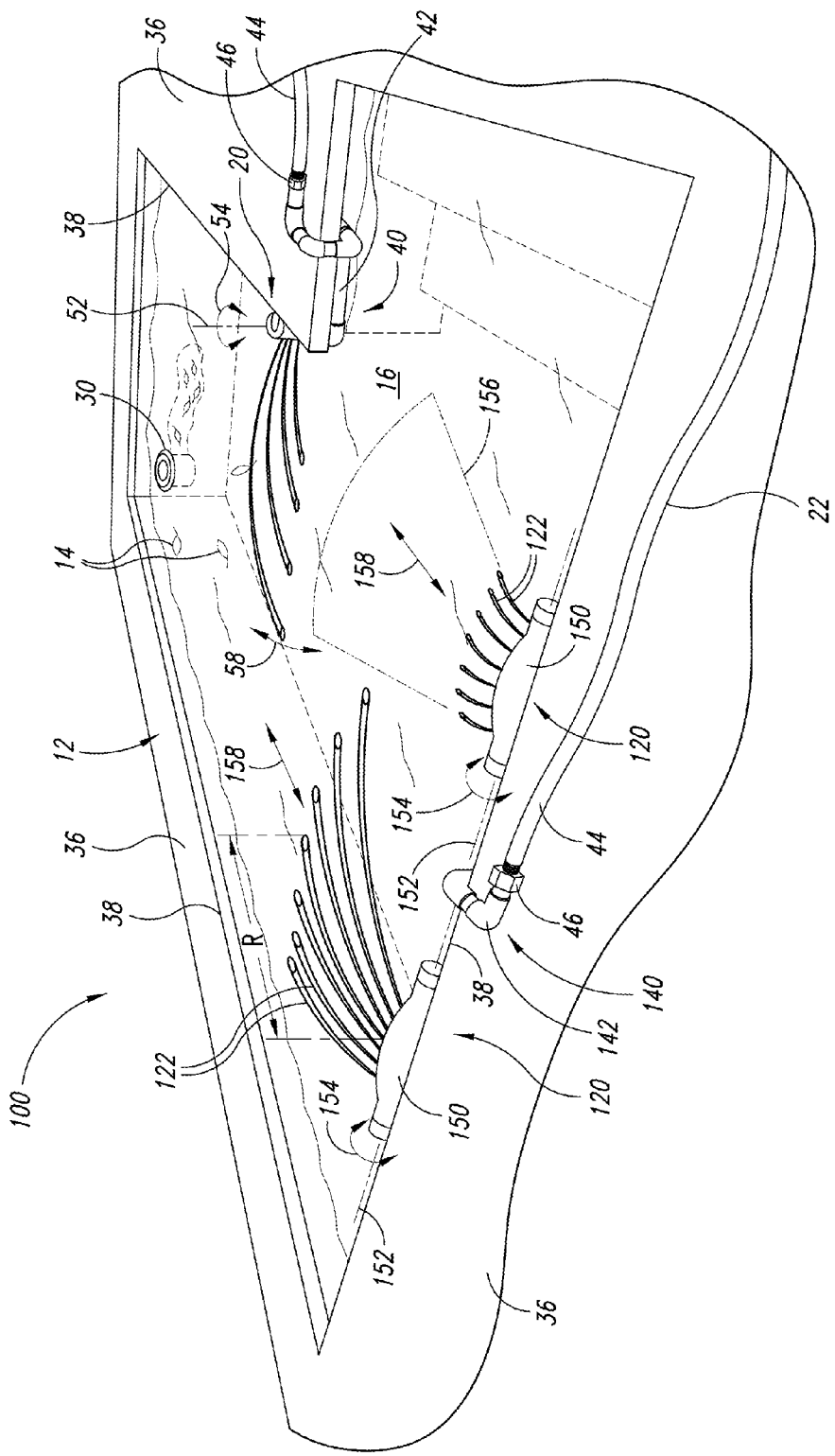
FIG. 2 is a perspective view of a skimming system for a pool according to another example embodiment.

FIG. 2 shows a skimming system 100 according to another example embodiment. The skimming system 100 is likewise installed in a swimming pool 12 for removing debris 14 from a surface 16 thereof. The skimming system 100 includes a plurality of fluid jet devices 120 which are each configured to selectively generate a plurality of fluid jets 122 when fluid is passed through respective fluid jet orifices thereof. The fluid jets 122 are oriented to impinge on the surface 16 of the pool 12 to collectively impart motion of the surface 16 of the pool 12 generally toward a debris collection device 30. Again, the debris collection device 30 may be a suction type device, such as, for example, the stationary suction-type debris collection device available from Poolskim USA of Wheaton, Illinois under the trademark Poolskim™ or any other device which is configured to collect and/or remove debris from a localized area of the pool 12. The debris collection device 30 may be fixedly secured to the pool 12 and located in a remote area of the pool 12 so as to minimize obstruction to swimming activities and the like.

The fluid jet devices 120 are positioned at or near the poolside or pool deck 36 surrounding the pool 12, and more particularly, along or adjacent the perimeter 38 of the pool 12. In the illustrated embodiment of FIG. 2, the fluid jet devices 120 are installed slightly within the perimeter 38 of the pool 12 at positions just above the surface 16 of the pool 12. In this manner, the fluid jets 122 may originate at a height below the surface of the pool deck 36 with a trajectory oriented generally away from the side of the pool 12 to impinge on the surface 16 of the pool 12 during operation. The fluid jet devices 120 may be configured so that during a skimming operation the fluid jets 122 impinge on the surface with relatively shallow striking angles α, such as, for example, striking angles which vary between about five degrees and about forty degrees. Although the fluid jets 122 may be generally collimated, as shown in FIG. 2, the fluid jets can be of various other forms and dispersion patterns, such as, for example, fan-shaped fluid jets and conical-shaped fluid jets. In addition, a single fluid jet 122 having a planar fan-shaped or other shaped dispersion pattern may be provided in lieu of the plurality of fluid jets 122. Accordingly, in some embodiments, the fluid jet or fluid jets 122 are better characterized by an average striking angle. In such embodiments, the average striking angle a of the fluid jet or jets 122 may be between about five degrees and about forty degrees, or in some embodiments, between about five degrees and twenty degrees. Irrespective of the specific striking angle, the fluid jets 122 are directed to impinge on the surface 16 of the pool 12 to impart a driving force having a horizontal component that acts parallel to the surface 16 of the pool 12 to direct the surface fluid and any debris thereon in a direction generally toward the debris collection device 30. Accordingly, in some embodiments, the average striking angle of the fluid jet or jets 122 may be greater than forty degrees and less than ninety degrees. It is appreciated, however, that the skimming operation may be less efficient in such embodiments as the relatively steeper striking angle results in a driving force having a horizontal component that is diminished relative to similar jets acting at relatively shallower striking angles.

The fluid jet devices 120 of FIG. 2 are coupled to the pool deck 36 by a poolside mounting device 140 in the form of a conduit system 142 which supports the fluid jet devices 120 above the surface 16 of the pool 12. The conduit system 142 may be removably secured to the pool deck 36 with conventional fasteners, such as, for example, threaded bolts or clamps, or may be integrated into the pool deck 36 during construction or reconstruction of the pool 12. In some embodiments, the fluid jet devices 120 may be mounted on the pool deck 36 in select locations and reconfigured as needed to ensure sufficient coverage of the surface 16 with the impinging fluid jets 122.

In the embodiment of FIG. 2, the conduit system 142 is coupleable to a fluid source (not show), such as, for example, a supply of residential water. The water supply may be coupled to the conduit system 142 by a conventional garden hose 44 and associated fittings 46. In some embodiments, a manifold (not shown) may be provided to assist in distribution of the water to the fluid jet devices 20. A controller and/or valves (not shown) may be provided intermediate the water supply and the fluid jet devices 120 to selectively control a flow of water to each of the fluid jet devices 120. For example, in some embodiments, a controller may be provided in conjunction with a distribution manifold to coordinate the supply of fluid to the fluid jet devices 120. The fluid jet devices 120 may be coordinated, for example, to operate simultaneously or sequentially. In addition, a volumetric flow rate or other flow characteristics may be controlled to adjust a range R of the fluid jets 120 during operation. Still further, in some embodiments, a supplemental pump device may be coupled to the fluid source to enable the formation of high-pressure fluid jets. In other embodiments, the conduit system 142 may be coupled directly to the supply of residential water without a controller and with the supply of water being controlled solely by one or more manual valves, such as, for example, a water spigot.

The fluid jet devices 120 of FIG. 2 include a nozzle portion 150 that is configured to rotate about an axis of rotation 152, as represented by the arrows labeled 154. In this manner, the fluid jet devices 120 may rotate or oscillate so that the fluid jets 122 thereof sweep fore and aft through a respective sector 156 of the surface 16 of the pool 12, as represented by the arrows labeled 158. Sweeping the fluid jets 122 fore and aft enables the fluid jets 122 to impart motion to a relatively more substantial portion of the surface 16 of the pool 12. In addition, the sweeping motion can assist in driving debris 14 toward the debris collection device 30 more efficiently than embodiments featuring static nozzles.

The sectors 156 swept by the fluid jets 122 may collectively cover at least a majority of the surface 16 of the pool 12, and in some embodiments, may cover seventy-five percent or more of the surface 16. Each sector 156 may be a discrete isolated region or may overlap with one or more adjacent sectors 156. In some embodiments, the fluid jet devices 120 may be combined with other fluid jet devices, such as, for example, the fluid jet devices 20 described above with respect to FIG. 1. For example, as shown in FIG. 2, one or more fluid jet devices 120 configured to rotate about a horizontal axis of rotation 152, as represented by the arrow labeled 154, may cooperate with one or more fluid jet devices 20 configured to rotate about a generally vertical axis of rotation 52, as represented by the arrow labeled 54. In this manner, various overlapping and/or non-overlapping sectors 56, 156 defined by one or more respective fluid jets 22, 122 may be combined in various forms to cover at least a majority of the surface 16 of the pool 12.

In other embodiments, one or more of the fluid jet devices 120 may include a static nozzle portion such that the fluid jet or jets 122 thereof do not oscillate during the skimming operation. For example, in one embodiment, all of the fluid jet devices 120 of the skimming system 100 may include a static nozzle portion. In such embodiments, an operating pressure of the fluid jet devices 120 may optionally fluctuate to create a pulsing action of the fluid jet or jets 122 thereof.

Figure 3:
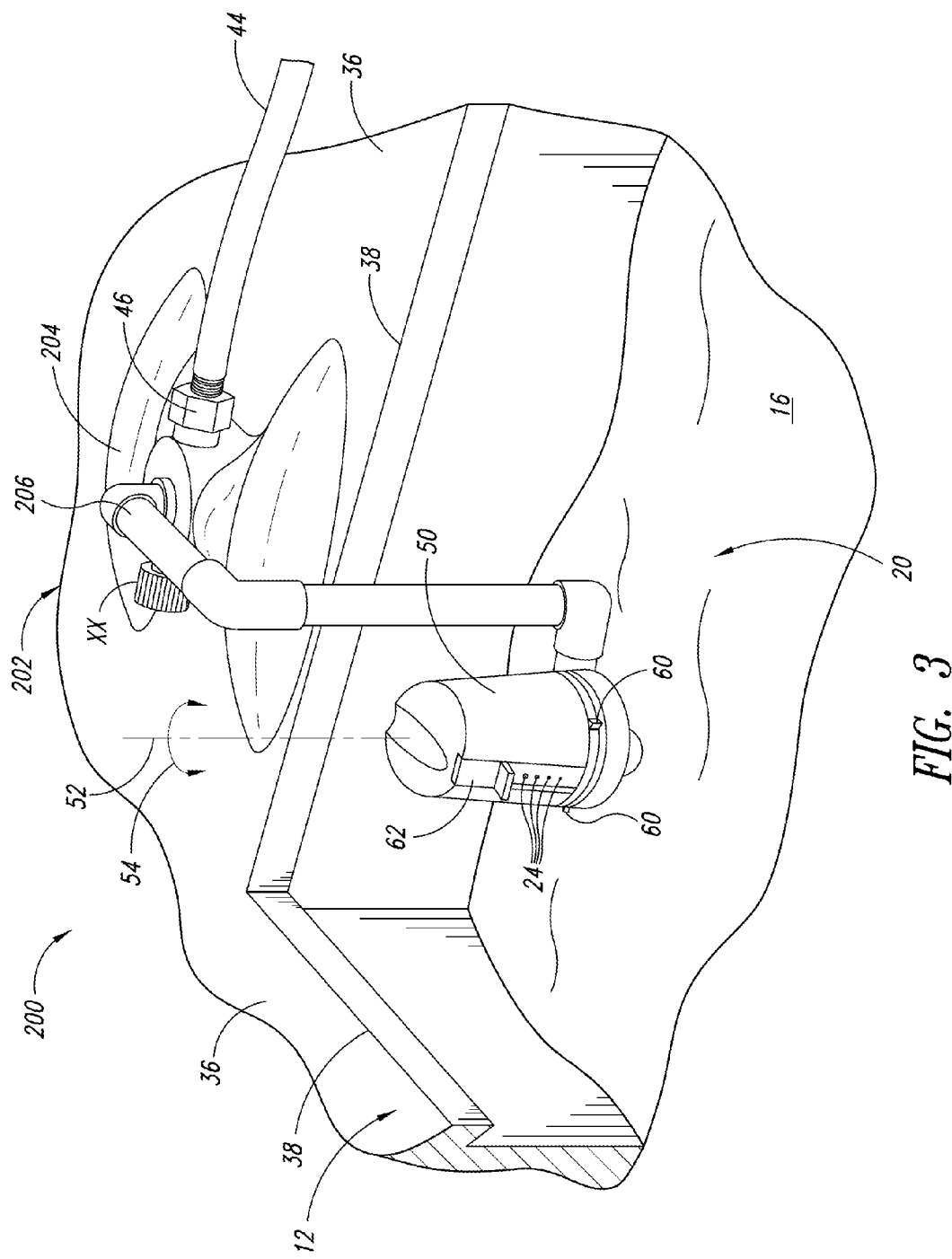
FIG. 3 is a perspective view of a skimming system for a pool according to yet another example embodiment.

FIG. 3 shows a skimming system 200 according to yet another example embodiment which enables a user to selectively position one or more fluid jet devices 20 about a perimeter 38 of a pool 12. In particular, a poolside mounting device 202 is provided in the form of a transportable base 204 and conduit support arm 206. The poolside mounting device 202 supports the fluid jet device 20 in space and orients the fluid jet device 20 so that the fluid jet or jets 22 selectively generated thereby impinge on the surface 16 of the pool 12 in a desired manner to direct any debris 14 on the surface 16 of the pool 12 toward a debris collection area.

As shown in FIG. 3, the base 204 may be designed to sit flush on the pool deck 36 and support the fluid jet device 20 at a level below the upper surface of the pool deck 36. In other embodiments, the fluid jet device 20 may be supported by a poolside mounting device at or above the upper surface of the pool deck 36. The poolside mounting device 202 may be in fluid communication with a fluid source (not shown), such as, a supply of residential water, via a conventional garden house 44 and fittings 46. A supplemental port 208 may also be provided to attach one or more additional fluid jet devices 20, 120 in series. In this manner, a user can selectively position one or more fluid jet devices 20, 120 around the perimeter 38 of the pool 12 as desired and connect each to a common fluid source to create an integrated skimming system 200 similar to the systems 10, 100 shown in FIGS. 1 and 2. The fluid jet device 20 supported by the poolside mounting device 202 may include adjustable features 60 for selectively limiting the travel of the nozzle portion 50 during operation. In addition, the fluid jet device 20 may include a shutter 62 for selectively blocking one or more fluid jet orifices 24 to temporarily prevent the generation of corresponding fluid jets 22. In some embodiments, the fluid jet device 20 may include a rotary type sprinkler head, such as those sold under the trade name Gilmour by Robert Bosch Tool Corporation of Peoria, Ill.

In some embodiments, the poolside mounting device 202 includes one or more manipulable joints to selectively orient the fluid jet device 20 with respect to the surface 16 of the pool 12. In particularly advantageous embodiments, the poolside mounting device 202 includes manipulable joints for selectively adjusting the orientation of the fluid jet device 20 with respect to at least two degrees of freedom, such as, for example, selectively adjusting a pitch and a yaw of the fluid jet device 20. In some embodiments, the pitch, yaw and roll of the fluid jet device 20 may be selectively adjusted. For instance, as shown in FIG. 3, the fluid jet device 20 may be selectively rotated about three orthogonal rotation axes 210, 214, 218, as represented by the arrows labeled 212, 216, and 220, respectively. In this manner, a user may manipulate the fluid jet device 20 in space to align the fluid jets 22 generated thereby in a desired orientation with respect to the surface 12 of the pool and surrounding structure of the pool deck 36. Accordingly, the poolside mounting device 202 provides a versatile mechanism that is adaptable to a variety of pool configurations and which may be readily adjusted to optimize performance.

The various skimming systems 10, 100, 200 described above provide simple and versatile mechanisms to effectively clear the surface 16 of a pool 12 of unwanted debris by impinging the surface 16 of the pool 12 with a plurality of fluid jets 22, 122 and, according to some embodiments, moving the fluid jets 22, 122 in a selected pattern so that the fluid jets 22, 122 sweep across a significant portion of the surface 16 to collectively impart motion of the surface 16 of the pool 12 and any debris thereon toward a debris collection device 30.

Figure 4:
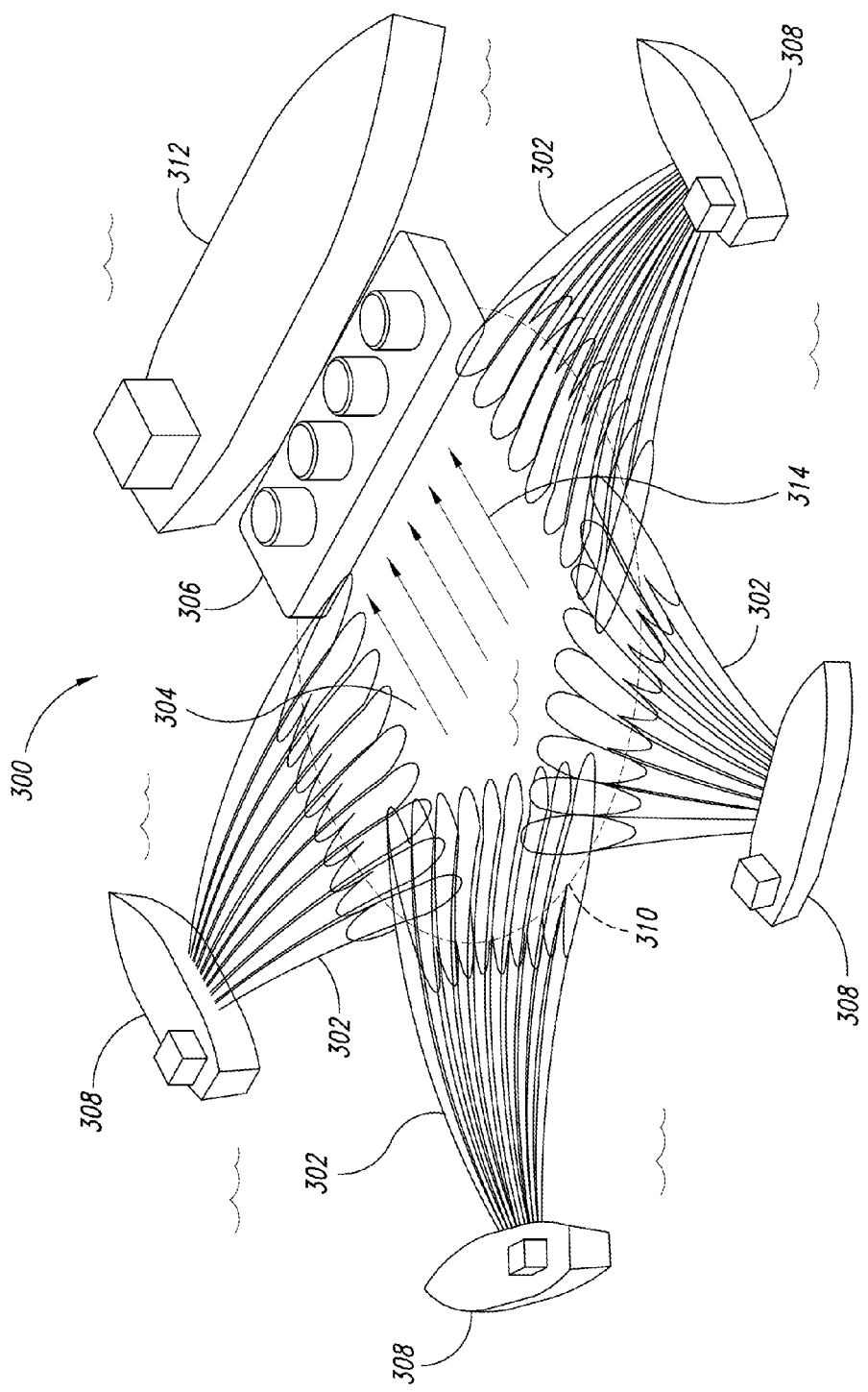
FIG. 4 is a perspective view of a skimming system for treating oil spills according to one example embodiment.

Although the skimming systems 10, 100, 200 discussed above have been described in the context of skimming systems for swimming pools, it is appreciated that aspects and principles of the aforementioned skimming systems 10, 100, 200 may be applied to directing, collecting and removing surface debris from the surface of other fluid bodies. For example, in some embodiments, a skimming system 300 having a plurality of fluid jets 302 may be provided to assist in directing oil 304 on the surface of the sea toward an oil separation device 306 for the collection and removal thereof, as shown in FIG. 4. More particularly, a number of fluid jet generating stations 308 equipped with fluid canons (not shown) may be positioned around a perimeter 310 of an isolated oil spill 304 and oriented so that a plurality of fluid jets 302 impinge on the oil 304 at a relatively shallow average striking angle (e.g., less than about forty-five degrees) to impart motion to the oil 304 in a direction generally away from the source of the respective fluid jet 302. In other embodiments, the plurality of fluid jets 302 may impinge on the oil 304 at a relatively steeper average striking angle while still imparting motion to the oil 304 in a direction generally away from the source of the respective fluid jet 302. For example, the average striking angle may be greater than about forty-five degrees and less than about ninety degrees.

The fluid jet generating stations 308 may be in the form of floating vessels, such as, ships, barges, platforms or the like. The fluid jet generating stations 308 may collectively generate fluid jets 302 which disperse to impinge over at least a majority of the perimeter 310 of the isolated spill. Fluid jet generating stations 308 may also be positioned within the perimeter 310 of the isolated oil spill 304 or within alcoves of the same to assist in imparting motion to the oil 304. Irrespective of the position of the generating stations 308, the fluid jets 302 are arranged to collectively impart a motion of the oil 304 generally in a direction of the oil separation station 306 for separating and removing the oil from the sea. An oil collection vessel 312 may be positioned in the vicinity of the oil separation station 306 to receive the oil which is removed from the sea.

In some embodiments, the oil separation station 306 may be positioned to generally align transversely with a direction of movement of the oil spill 304 arising from natural forces such as, for example, wind, waves and natural currents, as represented by the arrows labeled 314. The fluid jet generating stations 308 may be positioned around the oil spill 304 such that the fluid jets 302 resemble spokes of a wheel, as shown in FIG. 4. The fluid jet generating stations 308 may be positioned in regular or irregular intervals. The number of fluid jet generating stations 308 positioned around the oil spill 304 may vary based on, for example, the size of the oil spill 304 and the capacity of each fluid jet generating stations 308 to produce fluid jets 302. In some embodiments, generating stations 308 may also be positioned within the perimeter 310 of the isolated oil spill 304 or within alcoves of the same.

Although the fluid jets 302 are shown as steady streams in a fixed orientation, it is appreciated that the fluid canons of the fluid jet generating stations 308 may be rotatably mounted so as to enable sweeping or oscillating motions of the fluid jets 302 during a cleanup operation. The fluid jets 302 may oscillate side-to-side or pitch up and down. Furthermore, although the fluid jets 302 are illustrated as originating from a horizontally aligned array of fluid canons and having a generally column-like or slightly conical shape, it is appreciated that more or fewer fluid canons may be provided (including a single fluid canon) and that the fluid canons may be configured to generate fluid jets 302 of various shapes or dispersion patterns, such as, for example, fan-shaped dispersion patterns.

In some particularly advantageous embodiments, the nozzles of the fluid canons are configured to disperse the fluid jets 302 into relatively fine droplets such that the droplets do not significantly agitate or break up the oil 304 as the droplets impact the surface of the oil 304. Accordingly, the droplets may impact the oil 304 and collectively impart a driving force to the same in a direction generally horizontal to the surface of the sea without significant agitation which might otherwise hinder the oil collection and separation operation.

As can be appreciated from the above disclosure, embodiments of the skimming systems and methods described herein may operate on a variety of different fluids to direct, collect and remove various contaminants and the systems and methods may be scaled accordingly. The systems and methods may be configured to avoid significant agitation of the contaminants and host fluid so as to avoid undesired mixing and/or sinking of the contaminants, which might otherwise require dredging or other laborious activities. For example, according to some embodiments, the systems and methods may advantageously generate a relatively light overspray over a target surface to collectively impart a gentle drift of contaminants toward a collection device with minimal disturbance. In other embodiments, more aggressive driving forces may be generated to expedite collection of the contaminants when agitation may be of less concern. This may be achieved by increasing the flow rate or velocity of the fluid jets, such as, by increasing the operational pressure of the fluid jets and/or by decreasing the size of the fluid jet generating orifices.

Upon reviewing the present disclosure, one of ordinary skill in the art will appreciate that a variety of different nozzle configurations and flow conditions may be selected to generate fluid jets of varying shapes, trajectories and other characteristics, and that the particular characteristics of the fluid jets may be optimized based at least in part on the specific application (e.g., pool skimming) and characteristics of the fluid body to be treated. For example, a relatively small rectangular pool lacking alcoves or other features that may inhibit drift can be effectively cleared of debris using a single fixed position fluid jet having a horizontal fan-shaped configuration generated using the pressure available from a residential water source without a supplemental pressurizing device. The system may further include rotation or oscillation of the fluid jet generating device to increase the coverage and efficiency of the skimming system.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of skimming debris or other material from a surface of a body of fluid of a pool, the method comprising:

impinging the surface of the body of fluid of the pool with a plurality of fluid jets, the fluid jets oriented to impinge on the surface at an average striking angle of less than forty-five degrees from above the surface of the body of fluid of the pool; and moving the plurality of fluid jets in a selected pattern so that the fluid jets sweep across at least a portion of the surface of the body of fluid of the pool while the fluid jets impinge on the surface the body of fluid to collectively impart motion of the surface of the body of fluid of the pool generally toward a debris collection device, wherein moving the plurality of fluid jets in the selected pattern includes oscillating a plurality of fluid jet devices each configured to generate at least one fluid jet so that the at least one fluid jet of each fluid jet device sweeps a respective section of the surface of the body of fluid of the pool; and the motion of the water moves the debris or other material toward the debris collection device such that the debris or other material is removed from the surface of the body of fluid of the pool.

2. The method of claim 1 wherein oscillating the plurality of fluid jet devices includes rotating a nozzle portion of at least one fluid jet device back and forth about an axis of rotation generally perpendicular to the surface of the body of fluid of the pool to sweep the at least one fluid jet thereof across a sector of the surface of the body of fluid of the pool with a reach of the fluid jet remaining generally constant.

3. The method of claim 1 wherein oscillating the plurality of fluid jet devices includes rotating a nozzle portion of at least one fluid jet device back and forth about an axis of rotation generally parallel to the surface of the body of fluid of the pool to sweep the at least one fluid jet thereof across a sector of the surface of the body of fluid of the pool with a reach of the fluid jet varying as the nozzle portion rotates.

4. The method of claim 1 wherein oscillating the plurality of fluid jet devices includes oscillating the plurality of fluid jet devices in a coordinated manner to sweep at least a majority of the surface of the body of fluid of the pool.

5. The method of claim 1 wherein impinging the surface of the body of fluid of the pool with the plurality of fluid jets includes impinging the surface the body of fluid with at least one of a planar fan-shaped fluid jet, a conical-shaped fluid jet and an array of generally parallel acting fluid jets.

6. The method of claim 1 wherein impinging the surface of the body of fluid of the pool with the plurality of fluid jets includes impinging the surface of the body of fluid of the pool with the plurality of fluid jets oriented to impinge on the surface the body of fluid at an average striking angle between about five degrees and about forty degrees.

7. The method of claim 1, further comprising:

positioning at least one fluid jet device at a perimeter of the pool to selectively generate at least one of the plurality of fluid jets for impinging on the surface of the body of fluid of the pool.

8. The method of claim 7 wherein positioning at least one fluid jet device at the perimeter of the pool includes positioning a series of fluid jet devices along the perimeter of the pool, each fluid jet device configured to selectively generate at least one of the plurality of fluid jets for impinging on the surface of the body of fluid of the pool.

9. The method of claim 7 wherein positioning at least one fluid jet device at the perimeter of the pool includes selectively adjusting a pitch and a yaw of the fluid jet device.

* * * * *